(12) United States Patent
Arnold

(10) Patent No.: US 8,797,415 B2
(45) Date of Patent: Aug. 5, 2014

(54) DEVICE, SYSTEM AND METHOD FOR IMAGE CAPTURE DEVICE USING WEATHER INFORMATION

(75) Inventor: Baron Arnold, Redwood City, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/245,400

(22) Filed: Sep. 26, 2011

(65) Prior Publication Data

US 2013/0076926 A1    Mar. 28, 2013

(51) Int. Cl.
*H04N 5/232* (2006.01)
(52) U.S. Cl.
USPC .................... 348/211.99; 348/223.1; 348/239
(58) Field of Classification Search
USPC ................. 348/223.1, 239, 211.99
See application file for complete search history.

(56) References Cited

U.S. PATENT DOCUMENTS

2009/0079846 A1* 3/2009 Chou ........................ 348/223.1
2010/0277618 A1* 11/2010 Hiratsuka .................... 348/239
2011/0050909 A1* 3/2011 Ellenby et al. ............. 348/207.1
2011/0102630 A1   5/2011 Rukes
2012/0262069 A1* 10/2012 Reed ............................ 315/130

FOREIGN PATENT DOCUMENTS

| JP | 2000244940 A | | 9/2000 |
| KR | 10-0723676 | * | 5/2007 |
| KR | 100723676 | | 5/2007 |
| WO | 2006049802 A2 | | 5/2006 |

* cited by examiner

*Primary Examiner* — Roberto Velez
*Assistant Examiner* — Yih-Sien Kao
(74) *Attorney, Agent, or Firm* — Troutman Sanders LLP; James E. Schutz; Christopher W. Glass

(57) ABSTRACT

Disclosed herein is a method for capturing an image using an image capture device equipped with a processor. The method includes receiving an electromagnetic signal transmitted from a remote station, determining a location of the image capture device based on the received electromagnetic signal, establishing communication over a network between the image capture device and a remote server, transmitting a request to the remote server for weather information pertaining to the determined location; receiving the weather information, determining an ambient lighting value based on the weather information, capturing an image using the image capture device, and processing the captured image using the determined ambient lighting value.

17 Claims, 3 Drawing Sheets

DEVICE, SYSTEM AND METHOD FOR IMAGE CAPTURE DEVICE USING WEATHER INFORMATION

TECHNICAL FIELD

The present invention relates in general to image capturing devices.

BACKGROUND

Different lighting conditions can sometimes cause modern image capture devices to produce captured images of undesired visual quality. For example, captured images can have a yellow/orange cast in incandescent lighting and a blue/green cast in fluorescent lighting.

To correct imbalances in color (e.g. the yellow/orange cast or bluish cast), some image capture devices include one or more settings to improve color quality. For example, some image capture devices include a manual and/or an automatic white balance setting. In a manual white balance setting, for example, the user of the image capture device can manually identify which color represents white. In some instances, however, the manual setting may be incorrect because, for example, a user may have failed to remember to update the setting to match present lighting conditions.

In image capture devices that have an automatic white balance setting, for example, the image capture device will automatically attempt to identify which color represents white. Sometimes, however, the automatic setting may not be optimal for present lighting conditions.

SUMMARY

Disclosed herein are embodiments of systems, methods, and apparatuses for capture an image.

One aspect of the disclosed embodiments is a method for capturing an image using an image capture device equipped with a processor. The method includes receiving an electromagnetic signal transmitted from a remote station, determining a location of the image capture device based on the received electromagnetic signal and establishing communication over a network between the image capture device and a remote server. The method also includes transmitting a request to the remote server for weather information pertaining to the determined location and receiving the weather information. Further, the method includes, determining an ambient lighting value based on the weather information, capturing an image using the image capture device and processing the captured image using the determined ambient lighting value.

Another aspect of the disclosed embodiments is an apparatus for capturing an image. The apparatus includes a memory and at least one processor configured to execute instructions stored in the memory to: receive an electromagnetic signal transmitted from a remote station, determine a location of the image capture device based on the received electromagnetic signal, and establish communication over a network to a remote server. The at east one processor is also configured to transmit a request to the remote server for weather information pertaining to the determined location, receive the weather information and determine an ambient lighting value based on the weather information. Further, the at least one processor is configured to capture an image and process the captured image using the determined ambient lighting value.

Another aspect of the disclosed embodiments is a system for capturing an image. The system includes an image capture device configured to receive an electromagnetic signal from a remote station and determine a location of the image capture device based on the received electromagnetic signal and a network. The system also includes a remote server configured to establish communication over the network with the image capture device to transmit weather information to the image capture device pertaining to the determined location. The image capture device is further configured to determine an ambient lighting value based on the weather information, capture an image using the image capture device and process the captured image using the determined ambient lighting value.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

The embodiments disclosed herein describe an image capture device, system and method which can improve the visual quality of captured images. Specifically, the embodiments can utilize weather and location information to automatically determine a suitable setting for the image capture device in current lighting conditions. The setting can then be used to adjust the data in the captured image such that it is, for example, saved, displayed, transmitted, etc. with a desirable quality.

Figure 1:
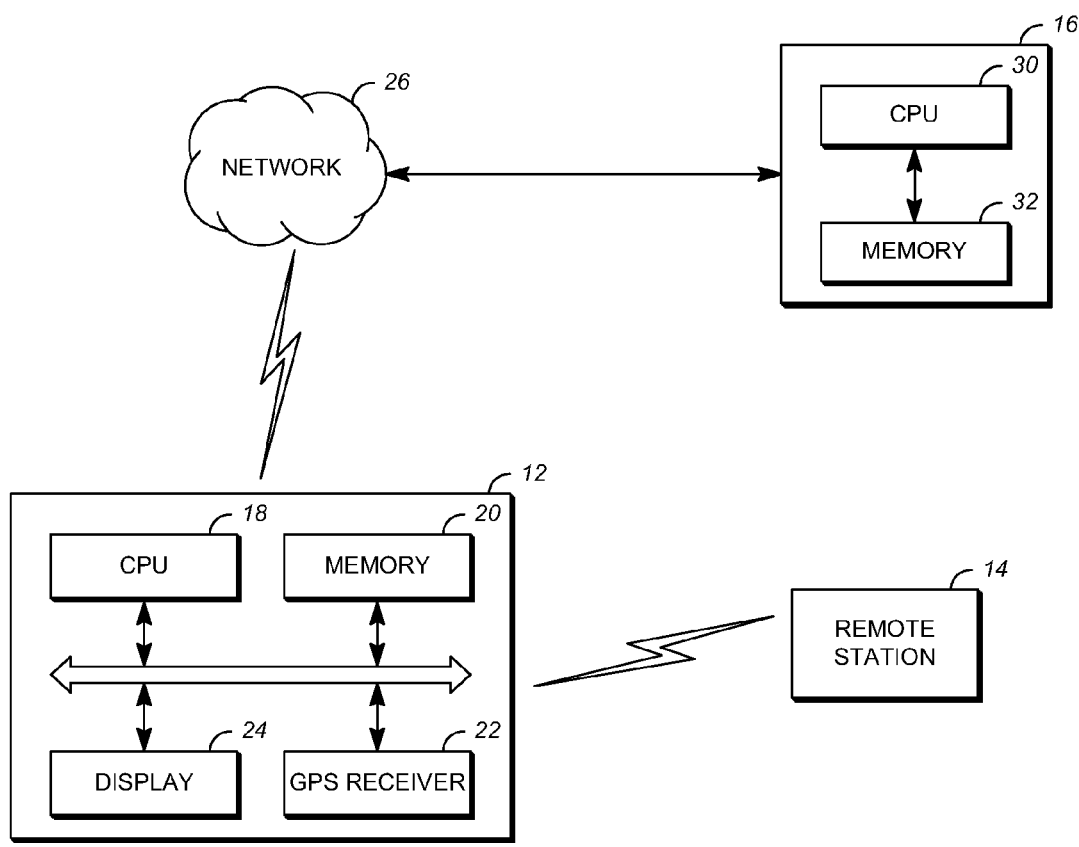
FIG. 1 is a block diagram of a image capture system according to one embodiment.

FIG. 1 is a block diagram of an image capture system 10 according to one embodiment. The image capture system 10 can include an image capture device 12, one or more remote stations 14 and a remote server 16. An exemplary image capture device 12 can be, for example, a computer having an internal configuration of hardware including a processor such as a central processing unit (CPU) 18 and a memory 20. The CPU 18 can be a controller for controlling the operations of the image capture device 12. The CPU 18 is connected to the memory 16 by, for example, a memory bus. The memory 20 can be random access memory (RAM) or any other suitable memory device. The memory 20 can store data and program instructions which are used by the CPU 18. Other suitable implementations of the image capture device are possible. For example, the processing of the image capture device 12 can be distributed among multiple devices.

The image capture device 12 can be any device equipped with a digital camera including, but not limited to, a mobile phone (e.g. camera phone or video phone), a digital camera, a video camera, a tablet, PDA or a laptop computer. Other suitable image capture devices are also possible.

The image capture device 12 can also include a location detection device such as a GPS receiver 22, which can receive an electromagnetic signal from one or more remote stations 14. Remote station 14 can be, for example, a global positioning system (GPS) satellite. Other types of remote stations are possible. Further, more than one remote station 14 can send electromagnetic signals to the image capture device 12. Based on the information received from the remote station 14, the image capture device 12 can determine its current location.

The image capture device 12 can also include a display 24. The display 24 can present an image or video captured by the image capture device 12. The display 24 can be implemented in various ways, including by a liquid crystal display (LCD) or a cathode-ray tube (CRT). The images or video presented that are presented on the display 24 can be those that have been processed according to the embodiments as will be described in more detail below.

A network 26 connects the image capture device 12 and the remote server 16 for receiving weather information. More specifically, the image capture device 12 can transmit a request for weather information to the remote server 16 pertaining to the current location of the image capture device. Details of the request will be discussed in more detail below.

The network 28 can, for example, be the Internet. The network 26 can also be a local area network (LAN), wide area network (WAN), virtual private network (VPN), or any other means of transferring the weather information from remote server 16.

An exemplary remote server 16 can be, for example, a computer having an internal configuration of hardware including a processor such as a central processing unit (CPU) 30 and a memory 32. The CPU 30 can be a controller for controlling the operations of the image capture device 12. The CPU 30 is connected to the memory 32 by, for example, a memory bus. The memory 32 can be random access memory (RAM) or any other suitable memory device. The memory 32 can store data and program instructions which are used by the CPU 30. Other suitable implementations of the image capture device are possible. For example, the processing of the remote server 16 can be distributed among multiple servers.

Figure 2:
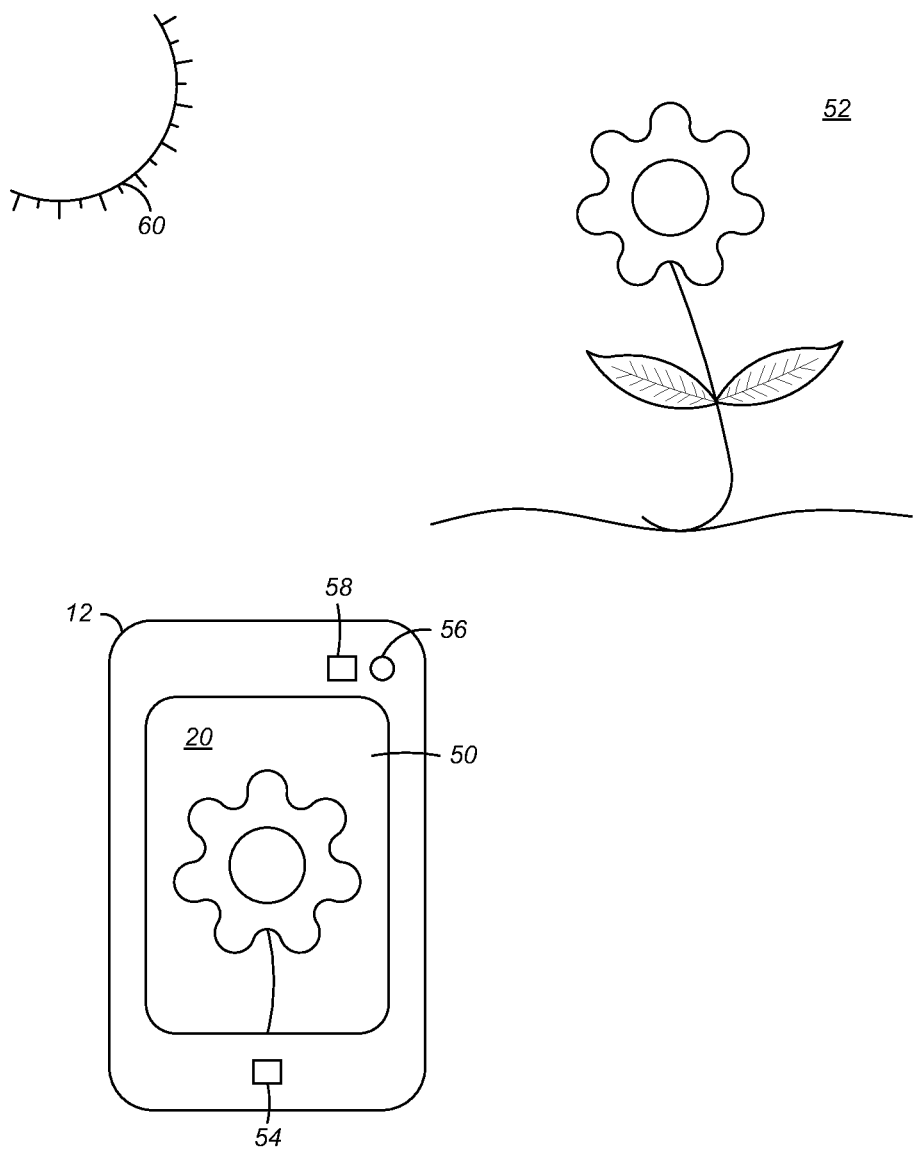
FIG. 2 is a schematic diagram of an image capture device in the system of FIG. 1.

FIG. 2 is a schematic diagram of the image capture device 12 capturing an image or video 50 of a scene 52 using the system 10 described above. The image capture device 12 can include a button 54, a lens 56 and a flash 58. The image capture device can also include elements in addition or in lieu of those described. For example, the image capture device can also include a touch screen. However, the description will only refer to the button 54, lens 56 and flash 58 to ease the reader's understanding of the embodiments. As is illustrated, the image being captured in sunny weather 60.

The user of the image capture device 12 can select or press the button 54 to capture the image or video that is before the lens 54 as desired. The image capture device 54 can either automatically determine or be programmed to produce a flash of light from the flash 58 during image capture. In this example, the image capture device 52 can identify its location based on communications received from remote station 14. Accordingly, before or simultaneously with when the user selects the button 54, weather information can be received from the remote server 16. In this example, the weather information can include, for example, information indicating that there is sunny weather 60. After the button 54 is selected, the image capture device 12 can capture the image and the captured image can be processed using the weather information. Details of the processing of the captured image 50 will be discussed in more detail hereafter.

Figure 3:
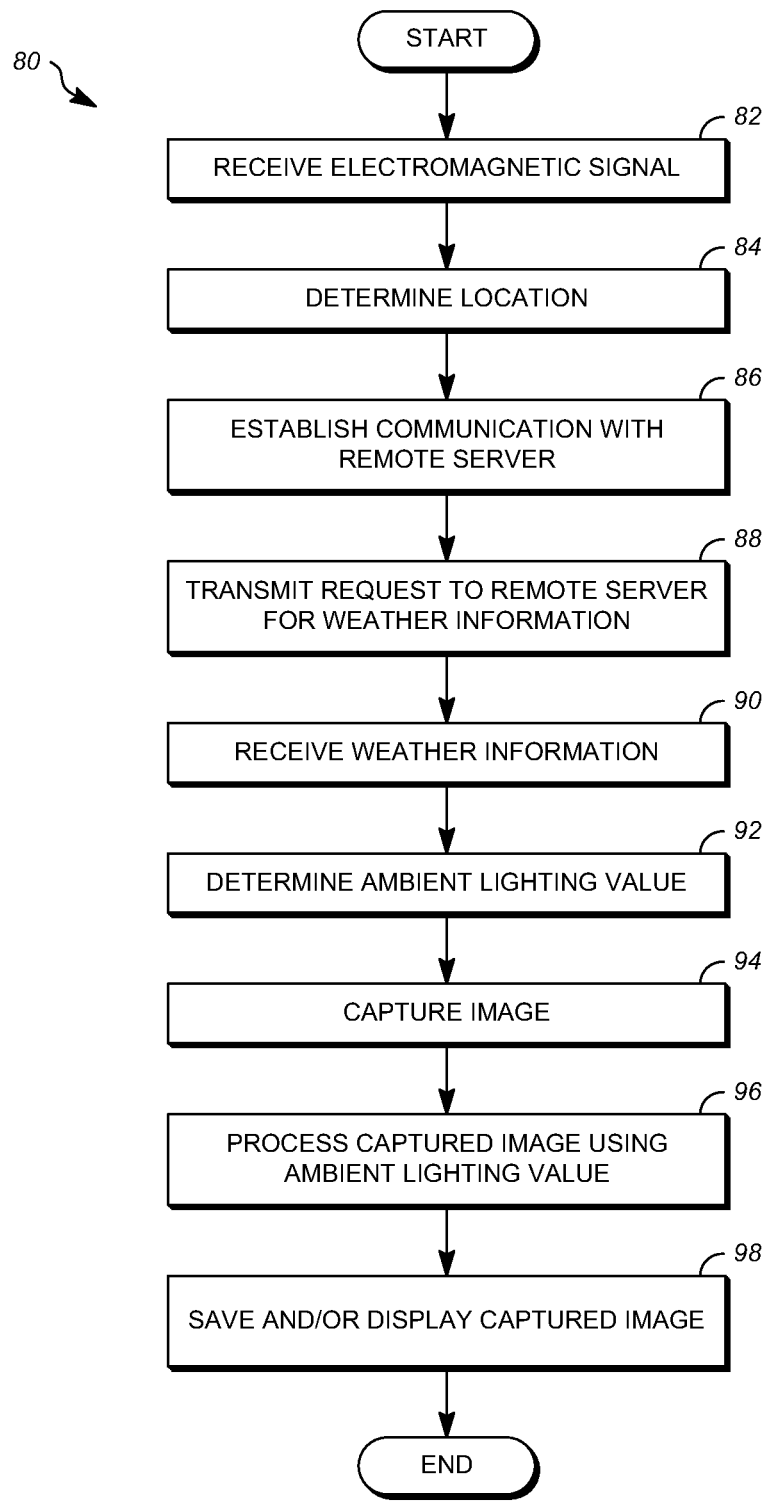
FIG. 3 is a flow diagram of an exemplary method of capturing an image using the system of FIG. 1.

FIG. 3 is a flow diagram of an exemplary method 80 of capturing an image using the system 10 described previously. Initially, at step 82, an image capture device (e.g., image capture device 12) can receive an electromagnetic signal from a remote station (e.g., remote station 14). Once the image capture device 12 has received the electromagnetic signal, the location of the image capture device can be determined at step 84. The location can include an At step 86, the image capture device can establish communication with a remote server (e.g., remote server 16). In some instances, communication may be established before the location of the image capture device 12 has been determined. The image capture device 12 can transmit a request for weather information to the remote server 16 pertaining to the current location of the image capture device 12 at step 88. The location can include, for example, the current latitude and longitude coordinates of the image capture device 12, whether the image capture device 12 is indoors or outdoors, an address of the image capture device 12 or any other location data. The location data may determined when the image capture device 12 is powered on, powered off periodically, non-periodically, at random, at the request of the user using the image capture device or at any other time.

In turn, the remote server 16 can respond to the request by transmitting the weather information pertaining to the determined location. Thus, for example, if the image capture device 12 is on 123 Any Street in Mountain View, Calif., the image capture device can transmit a request to the remote server 16 for current weather information in Mountain View Calif. The request may contain additional data or less data. For example, the request may also indicate that street address of the image capture device in order to increase the accuracy of the weather information.

The weather information can be "current" regardless of whether it is real-time information. Thus, for example, weather information collected by the remote server 16 before (e.g. 10 minutes before, 3 hours before, etc.) the request is sent from the image capture device 12 can still be considered current weather information.

The weather information sent to the image capture device 12 can include a temperature, cloudiness indicator, moisture indicator and/or any other weather information. For example, in one implementation, the weather information only includes a cloudiness indicator (e.g. sunny, partly cloudy, cloudy, etc.). In other implementations, the weather information includes the cloudiness indicator, a temperature (e.g. degrees Fahrenheit, degrees Celsius, etc.) and a moisture indicator (e.g. snow, rain, hail, etc.). Other types of weather information are also possible.

The weather information can also include forecast information which can be used in setting future settings of the image capture device 12. For example, the weather information can include weather forecast information for the next 2 hours. The image capture device 12 can then update its settings using the forecast information rather than the current weather information. This may be useful in instances, for example, where the image capture device 12 may not be able to communicate with the remote server 16.

Once the image capture device 12 has determined location and the weather information, an ambient lighting value can be determined. The ambient lighting value can be used to automatically set one or more settings on the image capture device 12 when an image has been captured. The settings can be, for example, a white balance, hue, saturation, sharpness, or contrast of the image. Other settings are also possible. Accordingly, for example, if the image capture device is outdoors on a cloudy day in London, England, an ambient lighting value can be determined such that it is indicative of cloudy weather. In turn, the ambient lighting value can be used to adjust one or more of the white balance, hue, saturation, sharpness, or contrast to suitable values for cloudy weather when the image is being processed.

Further for example, if the image capture device is indoors, the ambient lighting value can be set to be indicative of fluorescent or incandescent lighting. Similar to as discussed previously, the ambient lighting value can be used to adjust one or more of the white balance, hue, saturation, sharpness, or contrast to suitable values for indoor lighting when the image is being processed.

In some implementations, information in addition to location and weather is taken into account to determine an ambient lighting value. For example, the time of day or orientation information (i.e. which way the image capture device is facing) can be used to set the ambient lighting value.

Once the ambient lighting value is set, the image can be captured at step 94. Once the image has been captured, it can be processed using the ambient lighting value at step 96. The processing, as discussed previously, can involve automatically adjusting one or more of the white balance, hue, saturation, sharpness, contrast or any other setting. The image then can be saved at step 98 in, for example, JPEG or any other file format. Alternatively, or in addition to saving, the image can be displayed to the user. By adjusting the settings before processing, the quality of the captured image can be improved The steps of method 80 do not necessarily have to be executed in the order shown and described. For example, the user could begin the process by pressing a button to capture the image rather than determining location and weather information at the outset of the process. Once the user initiates a capture of an image, the location of the image capture device 12 can be determined and the weather information could then be transmitted to the user for processing of the image as previously described.

The embodiments of the image capture device 12 and/or the remote server 16 (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit or device capable of processing a signal or other data. In the claims, the term "processor" should be understood as encompassing any of the foregoing hardware, either singly or in combination. Further, portions of the image capture device 12 and the remote server 16 do not necessarily have to be implemented in the same manner.

Further, in one embodiment, for example, the image capture device 12 or the remote server 16 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method, comprising:
   determining, by a processor of an image capture device, a location of the image capture device;
   receiving, at the image capture device, and from a remote server, weather information corresponding to the determined location, the weather information including current weather information for a first time and weather forecast information for a future time period extending beyond the first time;
   capturing, by the image capture device, at a second time subsequent to the first time and within the future time period, an image;
   responsive to determining, by the processor, that the image capture device is not able to communicate with the remote server at the second time, automatically adjusting, by the processor, based at least on the weather forecast information, at least one setting for processing the captured image; and
   processing, by the processor, the captured image using the automatically adjusted at least one setting.

2. The method of claim 1, wherein processing the captured image using the automatically adjusted at least one setting includes automatically adjusting at least one of a white balance, hue, saturation, sharpness, or contrast of the captured image.

3. The method of claim 1, further comprising at least one of:
   saving, by the processor the processed image in memory; or
   outputting, by the processor, for display, the processed image.

4. The method of claim 1, wherein the weather information includes at least one of a temperature and a moisture indicator.

5. The method of claim 1, wherein determining the location of the image capture device comprises:
   determining whether the image capture device is indoors or outdoors.

6. The method of claim 1, wherein the image is one of a still image and a video image.

7. An image capture device, comprising:
   a memory; and
   at least one processor configured to execute instructions stored in the memory to:
   determine a location of the image capture device;
   receive, from a remote server, weather information corresponding to the determined location, the weather information including current weather information for a first time and weather forecast information for a future time period extending beyond the first time;
   capture an image at a second time subsequent to the first time and within the future time period;
   responsive to determining that the image capture device is not able to communicate with the remote server at the second time, automatically adjust, based at least on the weather forecast information, at least one setting for processing the captured image; and process the captured image using the automatically adjusted at least one setting.

8. The device of claim 7, wherein the at least one processor is configured to process the captured image by adjusting at least one of a white balance, hue, saturation, sharpness, or contrast of the captured image.

9. The device of claim 7, wherein the at least one processor is further configured to execute instructions stored in the memory to:
save the processed image in memory.

10. The device of claim 7, wherein the at least one processor is further configured to execute instructions stored in the memory to:
output the processed image for display.

11. The device of claim 7, wherein the at least one processor is further configured to execute instructions stored in the memory to:
capture an initial image when receiving the weather information;
determine whether the image capture device is indoors or outdoors when capturing the initial image;
determine an initial ambient lighting value based on at least one of the weather information when capturing the initial image and whether the image capture device is indoors or outdoors when capturing the initial image; and
process the initial image using at least one setting based on the initial ambient lighting value.

12. The device of claim 11, wherein the at least one processor is further configured to execute instructions stored in the memory to:
responsive to determining that the image capture device is outdoors when capturing the initial image, determine the initial ambient lighting value based on the weather information.

13. The device of claim 11, wherein the at least one processor is further configured to execute instructions stored in the memory to:
responsive to determining that the image capture device is indoors when capturing the initial image, determine the initial ambient lighting value without the weather information.

14. A system comprising:
an image capture device configured to determine a location of the image capture device;
a network; and
a remote server configured to transmit to the image capture device, weather information corresponding to the determined location, the weather information including current weather information for a first time and weather forecast information for a future time period extending beyond the first time;
wherein the image capture device is further configured to:
capture an image at a second time subsequent to the first time and within the future time period;
responsive to determining that the image capture device is not able to communicate with the remote server at the second time, automatically adjust, based at least on the weather forecast information, at least one setting for processing the captured image; and
process the captured image using the automatically adjusted at least one setting.

15. The system of claim 14, wherein the image capture device is further configured to:
capture an initial image when receiving the weather information;
determine an initial ambient lighting value based on at least one of the weather information for the current time and the determined location; and
process the captured initial image using at least one setting based on the initial ambient lighting value.

16. The system of claim 15, wherein the image capture device is further configured to determine the initial ambient lighting value based on only the determined location when the determined location corresponds to an indoor location, and wherein the image capture device is configured to determine the initial ambient lighting value based on the weather information for the first time and the determined location when the determined location corresponds to an outdoor location.

17. The system of claim 14, wherein the at least one setting is at least one of a white balance, hue, saturation, sharpness, or contrast of the captured image.

* * * * *